United States Patent

Marsh

[15] 3,639,175
[45] Feb. 1, 1972

[54] ADDITIVES FOR DRY CHARGED BATTERIES

[72] Inventor: Frederick L. Marsh, Minneapolis, Minn.

[73] Assignee: Gould-National Batteries, Inc., Saint Paul, Minn.

[22] Filed: July 2, 1969

[21] Appl. No.: 838,693

[52] U.S. Cl..................................... 136/154, 156, 157, 161
[51] Int. Cl................................. H01m 9/00, H01m 39/04
[58] Field of Search.......................... 136/154, 156, 157, 161

[56] References Cited

UNITED STATES PATENTS

| | | | |
|---|---|---|---|
| 1,748,485 | 2/1930 | Kugel............................. | 136/154 |
| 3,011,007 | 11/1961 | Evers et al..................... | 136/154 XR |
| 3,447,969 | 6/1969 | Tudor et al.................... | 136/154 XR |

*Primary Examiner*—Donald L. Walton
*Attorneys*—Stryker and Jacobson

[57] ABSTRACT

A container having a zirconium affording substance that dissolves upon activation by water to precipitate the phosphates out to the electrolyte formed from the activation of a water activatable, boron phosphate sulphuric acid gel used in a dry charged battery.

4 Claims, No Drawing Figs.

3,639,175

ADDITIVES FOR DRY CHARGED BATTERIES

BACKGROUND OF THE INVENTION

Field of the Invention

This invention relates generally to immobilized electrolytes for secondary cells and, more particularly, to an additive to sulphuric acid boron phosphate gels that precipitates the phosphate from the electrolyte after activation.

Description of the Prior Art

Recent advances have been made in the manufacture of immobilized gels for use in dry charged lead acid batteries. One such gel is shown and described in the assignee's co-pending patent applications of Martin H. Little filed April 28, 1967, Ser. No. 636,238, now Pat. No. 3,530,002, and the patent application Ser. No. 838,643 of Kirk L. Thompson and Frederick L. Marsh which was filed on even date herewith.

Typically, the gel comprises a sulphuric acid solution that is gelled with boron phosphate and then heat treated to eliminate syneresis effects. This type of gel has been found to have superior qualities in retaining the sulphuric acid in an immobilized state within the battery container and also the ability to readily absorb up to 20 percent water by weight before dissolving.

However, experimental tests have revealed that the cycle life of these dry charged batteries which contain a gel that utilizes phosphoric acid as a component for immobilizing the sulphuric acid electrolyte have a shorter cycle life than cells that contain no phosphoric acid in the electrolyte. It is believed that the loss of cycle life is due to the phosphates in the electrolyte which cause a portion of the positive active material in the plates to become isolated from the cell reactions.

In the preparation of these gels that immobilize the sulphuric acid, it is preferred to use a solution of concentrated sulphuric acid which is slightly less than 100 percent sulphuric acid with the remainder being water. The concentrated sulphuric acid liquid is very corrosive and only a few materials remain unaffected by its presence. The solutions of sulphuric acid are mixed together and then allowed to gel in a first container which is unaffected by sulphuric acid. Next, the gel is transferred to a second container for insertion into the battery. As the sulphuric acid remains in an immobilized state, the second container need not be impervious to sulphuric acid. However, the handling of the gel is undesirable as it tends to reduce the firmness and stability of the gel. Ideally, it would be desirable if the gel could be prepared in situ and then inserted into a container that would collapse when the battery is activated. However, some of the container materials that could be used to prepare the gel have an adverse electrochemical effect on the electrolyte after activation. In addition, if the container does not collapse after activation there is the opportunity for gases to be trapped in the container during the operation of the battery.

In the present invention it was discovered that unexpected and unusual results occur if the container is prepared using a zirconium sulfate binder with a carded asbestos felt container material. This type of container has been found to be chemically stable even though the containers were soaked in a 100 percent sulfuric acid solution at 200° C. for one hour. While the zirconium sulfate binder is resistant to the 100 percent concentration of sulfuric acid, it dissolves rather readily upon contact with water. Thus, the container that is bound together with zirconium sulfate binder begins to dissolve and collapse upon addition of water to the dry charged battery. This is a desirable feature as it allows the tray to collapse and thus not trap gases within the battery container once the battery is placed into operation.

In addition, it was discovered that zirconium sulfate binder in the container precipitated out the phosphates in the electrolyte after the gel had been dissolved. This was found to be beneficial as it restored the cycle life of the battery.

In addition, because zirconium sulfate binder for a gel container is not affected by concentrated sulphuric acid, it allows for in situ preparation of the gel thus minimizing the handling of the sulfuric acid gel in its immobilized state.

This compound is also found advantageous in that the zirconium sulfate that precipitates out the phosphates has no adverse electrochemical effect on the cell reactions.

Summary of the Invention

Briefly, the invention comprises placing a soluble zirconium compound in a container where it can precipitate out phosphates that would shorten the cycle life of a secondary cell.

Description

Sulfuric acid of high density can be immobilized by the addition of small amounts of inorganic compounds such as boric and phosphoric acid to form a gel. The gel dissolves completely upon activation by water to form a sulphuric acid electrolyte containing the two inorganic components. Tests have revealed that the sulphuric acid electrolyte which has been gelled by boric and phosphoric acid had decreased the cycle life upon activation of the electrolyte by addition of water thereto.

This is unfortunate as the inorganic gelling agent provides the simplest and cheapest method of immobilizing a sulphuric acid electrolyte in a dry charged battery. Presently, no substitute has been found for eliminating the use of a phosphate producing compound in the gel process that is electrochemically inert and still suitable for immobilizing the sulphuric acid in gel form.

It has been discovered that the addition of a water soluble sulphuric zirconium compound such as zirconium sulfate to the dissolved gel eliminates the undesirable decrease in cell cycling life which is attributable to the inorganic phosphoric acid located in the sulphuric acid electrolyte.

In the preparation of a typical gel container, a soluble zirconium compound such as zirconium sulphate can be either placed in the gel tray or impregnated into the gel tray or used as a binder for holding the tray together. The latter use of the zirconium as a binder is preferred as it produces a tray that is collapsible when brought into contact with water.

In the typical preparation of the tray, a non-woven asbestos is wetted in a concentrated zirconium sulfate solution. The asbestos felt is formed into a suitable shape for a tray for a gel and dried at 425° C. for an hour. This produces a firm tray that is unaffected by concentrated sulphuric acid but will readily dissolve when exposed to water.

If a zirconium compound is impregnated into the tray or just placed loosely in the bottom of the container, then it is necessary to ensure that the proper amount of the zirconium compound is placed in the container. Test results reveal that placing equimolar properties of phosphoric acid and zirconium sulfate produce an effective precipitator of the phosphate from the solution. However, to ensure that all the phosphates are precipitated out, it is desirable to use a slightly larger molar concentration of the zirconium compound than the phosphate affording compound.

Cyclic voltametric tests were conducted with lead electrodes on the following solutions of electrolyte:

Solution
- A    4 molar sulphuric acid solution
- B    4 molar sulphuric acid+.1 molar phosphoric acid
- C    4 molar sulphuric acid, .1 molar phosphoric acid and .13 molar of zirconium sulfate In solution A and C the voltametric charts showed similar results but in solution B the voltametric charts showed several modifications of the pattern. Further life cycle tests confirmed that the electrolyte containing the phosphoric acid and the zirconium sulfate had a similar cycle life as the electrolyte containing sulphuric acid solution and that the sulphuric acid electrolyte with the phosphoric acid and no zirconium sulfate had as much as 40 percent decrease in cycle life.

These results are given as merely illustrative of the effect of the boron phosphate on the cycle life and the improvement of the cycle life through the addition of the zirconium affording substance to the electrolyte.

I claim:

1. A dry charged lead acid storage battery including a positive electrode, a negative electrode, and a water activatable electrolyte precursor, said electrolyte precursor comprising sulphuric acid gelled with boron phosphate, said electrolyte precursor dissolvable in water to form an electrolyte solution containing sulphuric acid and phosphoric acid, said storage battery further containing zirconium sulphate for reacting with said phosphoric acid to thereby precipitate zirconium phosphate from said electrolyte solution.

2. The product of claim 1 wherein the moles of zirconium sulphate are at least equal to the moles of phosphoric acid in the electrolyte.

3. A water activatable storage battery having improved operating characteristics comprising: a battery container; a water soluble electrolyte precursor located in said battery container; said electrolyte precursor comprising sulphuric acid solution gelled with boron phosphate so that upon the activation of said battery by the addition of water thereto, said electrolyte precursor yields an electrolyte solution comprising sulphuric acid and phosphoric acid; and zirconium sulphate located in said container for reacting with said phosphoric acid in said electrolyte solution to thereby precipitate zirconium phosphate from said electrolyte solution and thereby prevent the phosphoric acid from adversely affecting said battery.

4. The method of making an electrolyte for a storage battery comprising the steps of:
   (a) gelling sulphuric acid with boron phosphate to produce an electrolyte precursor;
   (b) placing the electrolyte precursor in a storage battery;
   (c) adding water to the electrolyte precursor to thereby dissolve the electrolyte precursor and form an electrolyte solution containing phosphoric acid; and
   (d) adding zirconium sulphate to said electrolyte solution to react with the phosphoric acid to thereby precipitate zirconium phosphate out of said electrolyte solution.